Dec. 11, 1928.
H. T. ROBERTS
VALVE
Filed Aug. 23, 1922
1,694,626
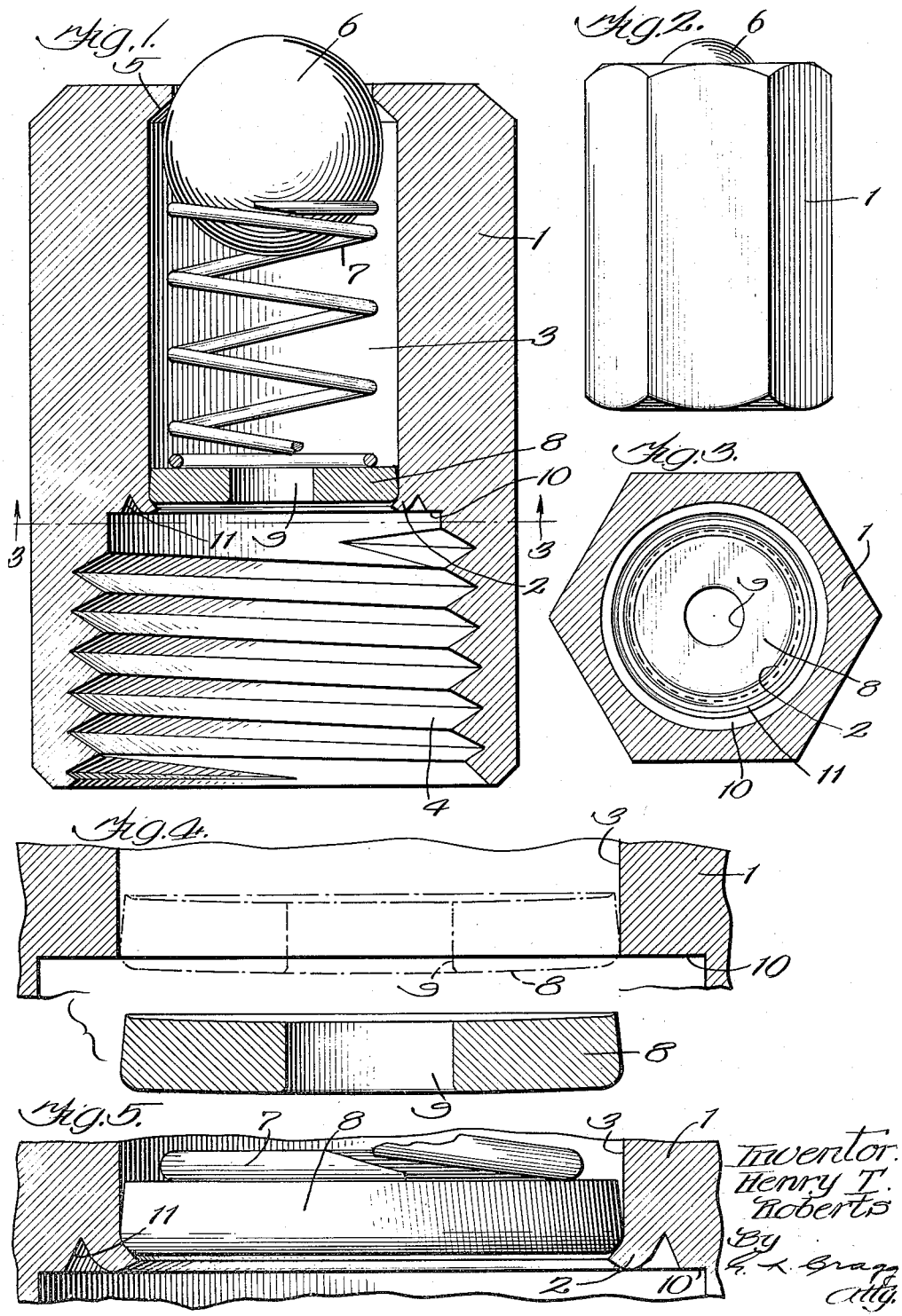

Patented Dec. 11, 1928.

1,694,626

UNITED STATES PATENT OFFICE.

HENRY T. ROBERTS, OF CHICAGO, ILLINOIS, ASSIGNOR TO ALEMITE MANUFACTURING CORPORATION, OF CHICAGO, ILLINOIS, A CORPORATION OF DELAWARE.

VALVE.

Application filed August 23, 1922. Serial No. 583,774.

My invention relates to valves of the class which are employed in the art of lubrication for the purpose of preventing the escape of lubricant that is applied to rubbing or working parts through the valves. The invention is an improvement upon those valves which are female threaded to receive male threaded pipe portions.

The valve structure of my invention includes a nipple having a bore extending longitudinally therethrough and formed with a transverse shoulder projecting into the bore at an intermediate portion thereof, one end of the bore being formed with a valve seat, a valve within the bore and engageable with said seat, and a valve closing spring supported by said shoulder and located within the portion of the bore having the valve seat and pressing outwardly upon said valve, the nipple being female threaded in the portion of its bore that does not contain said spring and valve.

In the preferred embodiment of the invention the bore is of smaller diameter upon one side of the shoulder than upon the other, the valve and spring being contained in the smaller bore portion. There is desirably also provided a plug which is seated upon the shoulder within the smaller bore portion, this plug having an aperture therein that establishes communication between the smaller and larger bore portions, the latter of which having the female threads.

The female threaded valve structure of my invention is much simpler than those which have hitherto been employed.

The invention will be more fully explained by reference to the accompanying drawing in which Fig. 1 is a longitudinal sectional view on a very large scale of a female threaded valve constructed in accordance with the preferred embodiment of the invention; Fig. 2 is a side view of the valve structure on a smaller scale; Fig. 3 is a sectional view on line 3—3 of Fig. 1 on a smaller scale; Fig. 4 is a view, somewhat diagrammatic, illustrating the manner in which the apertured plug is preferably applied; and Fig. 5 is a view showing in detail the assemblage of the apertured plug with and within the nipple.

Like parts are indicated by similar characters of reference throughout the different figures.

The valve structure includes a nipple 1 whose bore extends longitudinally therethrough in order that lubricant or other fluid may be admitted at one end and discharged at the other. The nipple is formed with a transverse shoulder 2 that projects into the nipple bore at an intermediate portion thereof. The bore is desirably of smaller diameter upon one side of the shoulder, as indicated at 3, and is preferably female threaded within the larger bore portion upon the other side of the shoulder, as indicated at 4. The outer end of the nipple is formed with a valve seat 5 and there is a ball valve 6 within its smaller bore portion that engages said seat in order to close the nipple at its inlet end. A valve closing coiled spring 7 is also located within the smaller bore portion, this valve spring being supported at its inner end by the shoulder 2 and pressing outwardly upon the ball valve at its outer end to have closing action upon said valve. The supporting relation between the shoulder 2 and the spring 7 is desirably effected through the intermediation of a plug 8 which is seated upon the shoulder 2 within the smaller bore portion and has an aperture 9 therein that establishes communication between the two bore portions to maintain the continuity thereof.

It will be observed that the shoulder 2 includes the inturned portion that underlies or is in supporting relation to the apertured plug 8 and a surrounding portion 10 whereby a broad abutment space is afforded that may receive the thrust of a male threaded pipe portion screwed into the female threaded portion of the nipple, the shoulder preventing this thrust from reaching the apertured plug and the valve mechanism within the smaller portion of the nipple bore.

While the shoulder may thus serve to guard the valve parts, it also supplies sufficient metal to furnish a spring supporting portion that projects into the bore, this spring supporting portion constituting a seat for the plug if the spring is to be supported upon the shoulder through the intermediation of the plug.

The plug is desirably in the form of a disc that is slightly tapered and which is entered into the smaller bore portion 3 before thhe seat 2 is formed and until the base of the disc that is preferably adapted for driving fit within the smaller bore portion occupies the position shown by the dot and dash lines in Fig. 4. After the disc plug is placed in this position a staking tool is employed in pressing the disc further into the bore portion 3 to bring the base of the disc into tight fit within said bore portion. This staking tool is desirably also formed to produce the annular groove 11 to infold the metal to produce the shoulder or seat 2 whereby the assembly of the disc plug and the nipple is further established and the disc plug is guarded from dislodgment by the male threaded pipe or other element approaching said plug from the treaded end of the nipple.

When the lubricant is to be admitted to the nipple and the nozzle of the utensil that is to supply lubricant is pressed upon the ball valve to open the inlet end of the nipple bore and permit the flow of lubricant first through the smaller bore portion 3, thence through the aperture 9 in the disc plug 8 and finally through the male threaded pipe within the female threaded portion of the nipple, whence the lubricant finds passage to the part to be lubricated.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A valve comprising a one-piece body portion axially bored, the bore being of reduced diameter throughout a portion of the length of the body, the enlarged portion of the bore being screwthreaded and defining an annular shoulder between the enlarged and restricted portions of the bore, a valve retaining plug adapted to be received within the restricted portion of the bore, such plug having its peripheral edge inwardly tapered in the direction of its insertion into the restricted portion of the bore, the metal of the aforesaid shoulder being upset to provide permanent retaining means for said plug, an inwardly directed annular flange at the outer end of the restricted portion of the bore, a valve member retained within said bore by the said shoulder, and a valve spring compressed between said plug and valve member for normally seating the said valve member against the annular flange.

2. A valve comprising a one-piece body portion of standard rod stock external surface of which is angularly shaped, the said body portion being axially bored and of reduced bore throughout a portion of its length, the enlarged portion of the bore being screwthreaded and defining an internal annular shoulder between the enlarged and reduced portions of the bore, a valve retaining plug adapted to be received within the restricted portion of the bore, such plug having its peripheral edge inwardly tapered in the direction of its insertion into the reduced portion of the bore, the metal of the aforesaid shoulder being upset to provide permanent retaining means for said plug, an inwardly directed annular flange at the outer end of the reduced portion of the bore, a valve member retained within said bore by the said shoulder and a valve spring compressed between said plug and valve member for normally seating the said valve member against the annular flange.

In witness whereof, I hereunto subscribe my name this 17th day of August, A. D., 1922.

HENRY T. ROBERTS.